US009440682B2

(12) United States Patent
Saje et al.

(10) Patent No.: US 9,440,682 B2
(45) Date of Patent: Sep. 13, 2016

(54) OUTWARD SPLAYED MIXED MATERIAL LONGITUDINAL RAIL SYSTEM

(71) Applicant: GM Global Technology Operations LLC, Detroit, MI (US)

(72) Inventors: Robert N. Saje, Shelby Township, MI (US); Terry A. Swartzell, Ann Arbor, MI (US); Artur Wyszynski, Oxford, MI (US); Robert M. Kielbik, Chesterfield Township, MI (US); Keith J. Saari, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/287,553

(22) Filed: May 27, 2014

(65) Prior Publication Data
US 2015/0001891 A1    Jan. 1, 2015

Related U.S. Application Data

(60) Provisional application No. 61/841,012, filed on Jun. 28, 2013.

(51) Int. Cl.
*B62D 25/08* (2006.01)
*B62D 25/20* (2006.01)

(52) U.S. Cl.
CPC ...... *B62D 25/2018* (2013.01); *Y10T 29/49622* (2015.01)

(58) Field of Classification Search
CPC .... B62D 65/00; B62D 27/023; B62D 21/02; B62D 25/025; B62D 25/04; B62D 21/00; B62D 21/09; B62D 21/15; B62D 25/08; B62D 25/14; B62D 25/20; B62D 25/2036; B62D 27/00; B62D 27/06; B62D 29/00

USPC ......... 296/203.2, 193.7, 187.12, 193.08, 296/193.06, 201, 204, 209, 70; 280/124.106, 800, 785, 101

See application file for complete search history.

(56) References Cited

U.S. PATENT DOCUMENTS

| 4,440,435 A | * | 4/1984 | Norlin | B62D 25/082 280/784 |
|---|---|---|---|---|
| 4,669,776 A | * | 6/1987 | Harasaki | B62D 25/025 296/192 |
| 4,950,025 A | * | 8/1990 | Yoshii | B62D 25/087 296/203.04 |
| 5,201,556 A | * | 4/1993 | Kendall | E05B 51/023 292/257 |
| 5,201,566 A | * | 4/1993 | Mori | B62D 21/11 296/192 |
| 6,938,948 B1 | * | 9/2005 | Cornell | B62D 21/155 296/187.09 |

(Continued)

FOREIGN PATENT DOCUMENTS

| CN | 102673660 A | 9/2012 |
|---|---|---|
| CN | 102791566 A | 11/2012 |

(Continued)

OTHER PUBLICATIONS

Chinese Office Action dated Jan. 22, 2016 ; Application No. 201410295855.1; Applicant: GM Global Technology Operations LLC.; 10 pages.

*Primary Examiner* — Glenn Dayoan
*Assistant Examiner* — Sunsurraye Westbrook
(74) *Attorney, Agent, or Firm* — BrooksGroup

(57) ABSTRACT

A product comprising a mixed material longitudinal rail system for a vehicle and a method of making the same.

14 Claims, 3 Drawing Sheets

(56) References Cited

U.S. PATENT DOCUMENTS

| | | | |
|---|---|---|---|
| 6,976,309 B2 * | 12/2005 | Mayer | B62D 25/025 228/141.1 |
| 7,347,491 B2 * | 3/2008 | Mouch | B62D 25/025 296/193.06 |
| 7,784,856 B2 * | 8/2010 | Fuchs | B32B 5/26 296/184.1 |
| 2012/0007373 A1 * | 1/2012 | Boettcher | B60R 19/24 293/132 |
| 2012/0248823 A1 * | 10/2012 | Mildner | B62D 25/088 296/203.02 |
| 2014/0312654 A1 * | 10/2014 | Komiya | B62D 21/11 296/187.09 |

FOREIGN PATENT DOCUMENTS

| | | |
|---|---|---|
| CN | 102905960 A | 1/2013 |
| CN | 103112503 A | 5/2013 |

* cited by examiner

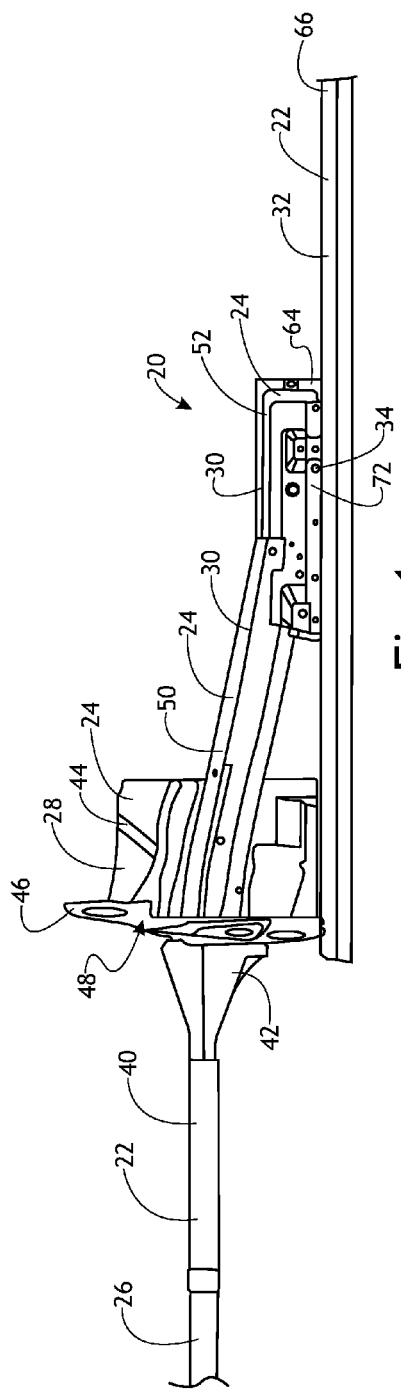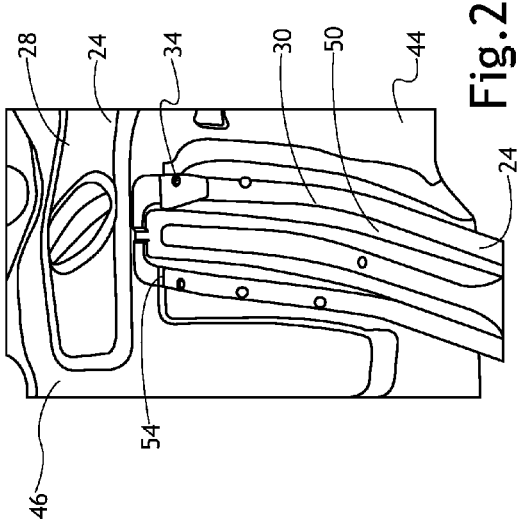

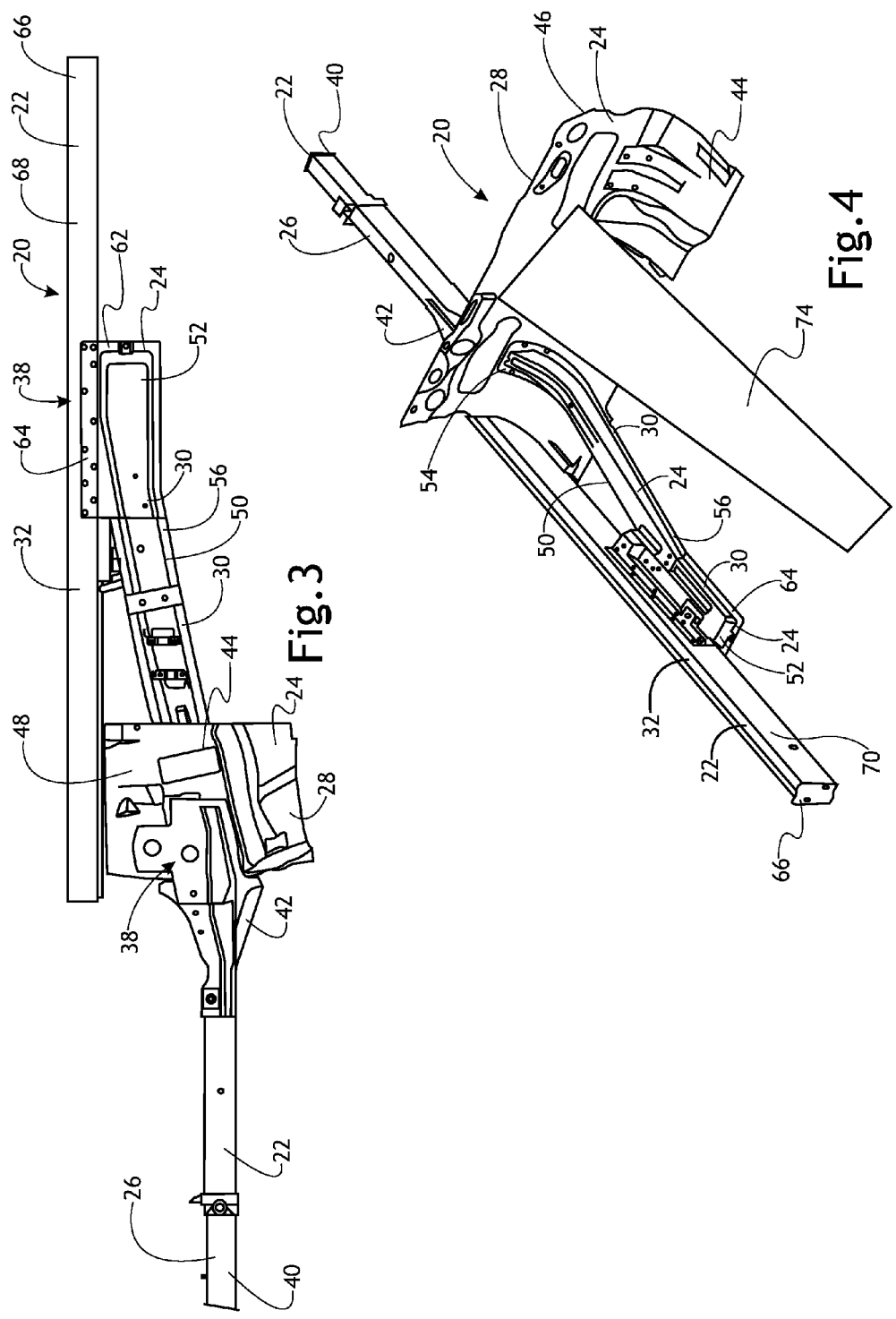

OUTWARD SPLAYED MIXED MATERIAL LONGITUDINAL RAIL SYSTEM

CROSS-REFERENCE TO RELATED APPLICATIONS

This application claims the benefit of U.S. Provisional Application No. 61/841,012 filed Jun. 28, 2013.

TECHNICAL FIELD

The field to which the disclosure generally relates to includes vehicle bodies.

BACKGROUND

A vehicle may include a frame structure.

SUMMARY OF ILLUSTRATIVE VARIATIONS

One variation may include a product comprising: a longitudinal rail system comprising: a front compartment rail assembly; wherein the front compartment rail assembly is attached to a dash panel; wherein the dash panel is attached to a floor compartment rail assembly; wherein the floor compartment rail assembly is attached to a rocker rail assembly; and wherein the longitudinal rail system comprises steel and aluminum.

Another variation may include a method comprising: constructing a mixed material longitudinal rail system comprising: attaching a steel dash panel and a steel floor compartment rail assembly to an aluminum front compartment rail assembly and an aluminum rocker rail assembly.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts a plan view of a longitudinal rail system according to a number of variations.

FIG. 2 depicts a close up front view of a longitudinal rail system according to a number of variations.

FIG. 3 depicts a bottom view of a longitudinal rail system according to a number of variations.

FIG. 4 depicts a perspective view of a longitudinal rail system according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 5:
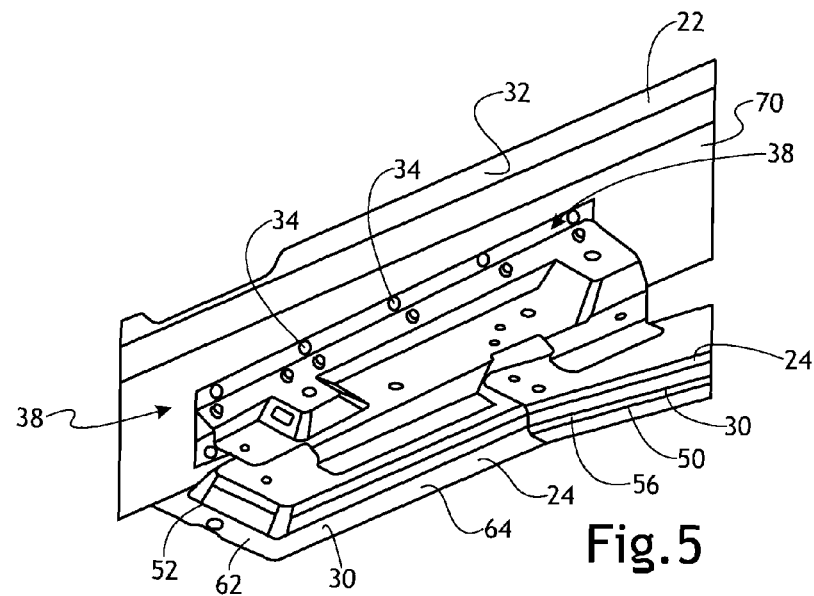
FIG. 5 depicts a close up of a floor compartment longitudinal rail system according to a number of variations.
Figure 6:
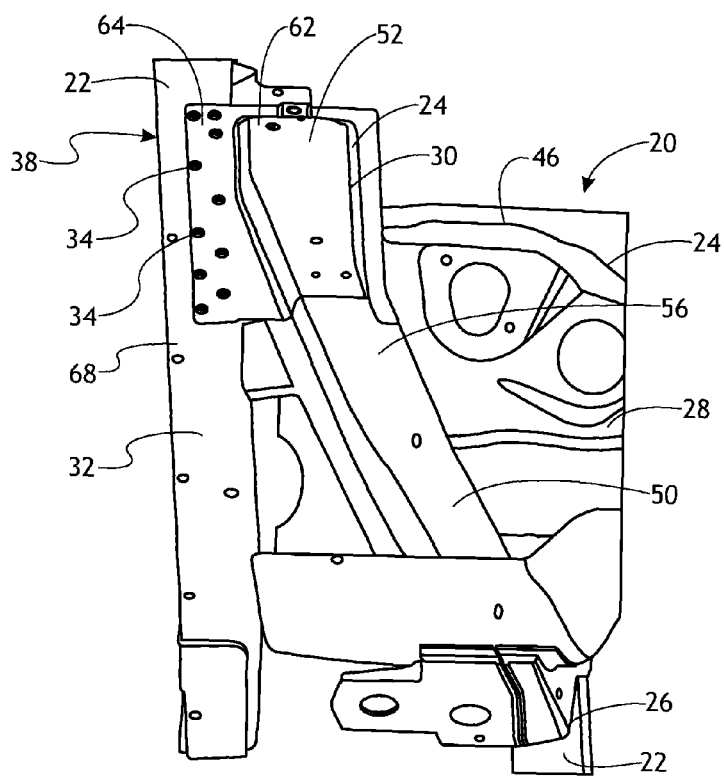
FIG. 6 depicts a close up perspective view of a longitudinal rail system according to a number of variations.

Referring to FIGS. 1-6, a vehicle body may include one or more longitudinal rail systems 20. In one variation, a longitudinal rail system 20 may be comprised of mixed materials which may optimize mass efficiency and may reduce the weight of the vehicle by allowing for the tuning of different grades and gages of various materials used on various components based on the structural requirements. In one variation, the longitudinal rail system 20 may include a plurality of components 26, 32 comprising aluminum 22 (including aluminum alloys) and a plurality of components 28, 30 comprising steel 24. The aluminum components 26, 32 and steel components 28, 30 may be assembled together in any of a variety of ways including, but not limited to, the use of a structural adhesive and a plurality of flow drill screws 34. The steel components 28, 30 may include a plurality of clearance holes (not illustrated) which may be constructed and arranged to accept a plurality of flow drill screws 34. The aluminum components 26, 32 may include a plurality of attachment areas 38 having a thickness of at least 2 mm in order to accommodate the plurality of flow drill screws 34. The steel components 28, 30 may each be attached to at least one aluminum component 26, 32 by applying a structural adhesive to either the steel components 28, 30, aluminum components 26, 32, or both 26, 28, 30, 32, and attaching the components together. The aluminum components 26, 32 and steel components 28, 30 may then be further secured together with a plurality of flow drill screws 34 which are placed in the clearance holes in the steel components 28, 30 and drilled into the attachment areas 38 of the aluminum components 26, 32.

In one variation, the longitudinal rail system 20 may include a front compartment rail assembly 26, a dash panel 28, a floor compartment rail assembly 30, and a rocker rail assembly 32. The front compartment rail assembly 26 may comprise aluminum 22. The front compartment rail assembly 26 may include a square-like beam structure 40 which may include a flare 42 as the square-like beam structure 40 extends toward the rear of the vehicle. The flared out portion 42 may be attached to a dash panel 28. The dash panel 28 may comprise steel 24. The dash panel 28 may extend approximately the width of the occupant compartment (not illustrated) and may form a curve between a base portion 44 and a wall portion 46. The front compartment rail assembly 26 may be attached to the dash panel 28 in any of a variety of ways including, but not limited to, attaching the flared out portion 42 of the front compartment rail assembly 26 to the back surface 48 of the base portion 44 of the dash panel 28 with the use of a structural adhesive and a plurality of flow drill screws 34.

The floor compartment rail assembly 30 may be comprised of steel 24 and may include a beam structure 50 and a bracket structure 52. The beam structure 50 may include a first end 54 and a second end 56. The first end 54 may be constructed and arranged to accommodate a dash panel 28. The second end 56 may be attached to a bracket structure 52. The bracket structure 52 may include a lip 64 on its bottom surface 62 which may be constructed and arranged to accommodate a rocker rail assembly 32. In one variation, the floor compartment rail assembly 30 may be comprised of two sub-assemblies, a beam structure assembly 58 and a bracket structure assembly 60. Each sub-assembly 58, 60 may comprise a different grade steel 24. The beam structure assembly 58 and bracket structure assembly 60 may be attached in any of a variety of ways including, but not limited to, spot welding.

The rocker rail assembly 32 may comprise aluminum 22 and may be constructed and arranged to extend along the side of a vehicle frame and may be a square-like shaped beam 66. The floor compartment rail assembly 30 may be attached to the rocker rail assembly 32 in any of a number of variations including, but not limited to, attaching the floor compartment rail assembly lip 64 on the bracket structure 52 to the underside 68 of the rocker rail assembly 32 via a structural adhesive and a plurality of flow drill screws 34 as well as attaching the outboard side 72 of the bracket structure 52 to the inboard 70 side of the rocker rail assembly 32. The floor compartment rail assembly 30 may also be attached to the dash panel 28 in any of a number of variations including, but not limited to, attaching the first end 54 of the beam structure 50 to the dash panel 28 with a structural adhesive and a plurality of flow drill screws 34, or welding. The floor compartment rail assembly 30 may also be attached to the floor panel (not illustrated) via spot welding.

In one variation, the floor compartment rail assembly 30 may be splayed outward as the beam structure 50 extends from the dash panel 28 to the bracket structure 52 which may be attached to the rocker rail assembly 32. The splaying of the floor compartment rail assembly 30 may allow for additional space between the tunnel 74, which is located approximately central of the dash panel 28, and the floor compartment rail assembly 30. The additional space between the tunnel 74 and the floor compartment rail assembly 30 may provide a flow drill gun (not illustrated) better access to the area which may result in more efficient joining of the components.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a longitudinal rail system comprising: a front compartment rail assembly; wherein the front compartment rail assembly is attached to a dash panel; wherein the dash panel is attached to a floor compartment rail assembly; wherein the floor compartment rail assembly is attached to a rocker rail assembly; and wherein the longitudinal rail system comprises steel and aluminum.

Variation 2 may include a product as set forth in Variation 1 wherein the front compartment rail assembly and the rocker rail assembly comprise aluminum; and wherein the dash panel and the floor compartment rail assembly comprise steel.

Variation 3 may include a product as set forth in any of Variations 1-2 wherein the front compartment rail assembly and the rocker rail assembly each include a plurality of attachment areas; wherein the attachment areas are at least 2 mm thick; and wherein the dash panel and the floor compartment rail assembly include a plurality of clearance holes constructed and arranged to accept a plurality of flow drill screws.

Variation 4 may include a product as set forth in any of Variations 1-3 wherein the front compartment rail assembly is attached to the dash panel via a structural adhesive and a plurality of flow drill screws; wherein the dash panel is attached to the floor compartment rail assembly via a structural adhesive and a plurality of flow drill screws; and wherein the floor compartment rail assembly is attached to the rocker rail assembly via a structural adhesive and a plurality of flow drill screws.

Variation 5 may include a product as set forth in any of Variations 1-4 wherein the floor compartment rail assembly comprises a first component and a second component; wherein the first component is a bracket structure and the second component is a bracket structure; and wherein the first component comprises a first grade of aluminum and the second component comprises a second grade of aluminum.

Variation 6 may include a product as set forth in any of Variations 1-5 wherein the first floor compartment rail component and the second floor compartment rail component are attached together via spot welding.

Variation 7 may include a product as set forth in any of Variations 1-6 wherein the floor compartment rail assembly splays outwardly as it extends from the dash panel to the rocker rail assembly.

Variation 8 may include a product as set forth in any of Variations 1-7 wherein the floor compartment rail assembly is constructed and arranged outwardly to accommodate a flow drill screw gun.

Variation 9 may include a product as set forth in any of Variations 1-8 wherein the longitudinal rail system is attached to a vehicle frame.

Variation 10 may include a method comprising: constructing a mixed material longitudinal rail system comprising: attaching a steel dash panel and a steel floor compartment rail assembly to an aluminum front compartment rail assembly and an aluminum rocker rail assembly.

Variation 11 may include a method as set forth in Variation 10 wherein the steel dash panel and the steel floor compartment rail assembly are attached to the aluminum front compartment rail assembly and the aluminum rocker rail assembly via a structural adhesive and a plurality of flow drill screws.

Variation 12 may include a method as set forth in any of Variations 10-11 wherein the floor compartment rail assembly is splayed outwardly from a vehicle.

Variation 13 may include a method as set forth in any of Variations 10-12 wherein the floor compartment rail assembly comprises a first component and a second component.

Variation 14 may include a method as set forth in any of Variations 10-13 wherein the first component comprises a first grade of aluminum and the second component comprises a second grade of aluminum.

Variation 15 may include a method as set forth in any of Variations 10-14 wherein the first component and second component are attached via spot welding.

The above description of select variations within the scope of the invention is merely illustrative in nature and, thus, variations or variants thereof are not to be regarded as a departure from the spirit and scope of the invention.

What is claimed is:
1. A product comprising:
a longitudinal rail system of a vehicle body comprising:
a front compartment rail assembly which extends along a length of the vehicle body;
wherein the front compartment rail assembly is attached to a front portion of a dash panel, wherein the dash panel extends across a width of the vehicle body;
a floor compartment rail assembly which extends horizontally along the length of the vehicle body, wherein the floor compartment rail assembly is attached to a rear side of the dash panel;

a rocker rail assembly which extends along the length of the vehicle body, wherein the rocker rail assembly is attached to the floor compartment rail; and wherein the longitudinal rail system comprises steel and aluminum.

2. The product of claim 1 wherein the front compartment rail assembly and the rocker rail assembly comprise aluminum; and wherein the dash panel and the floor compartment rail assembly comprise steel.

3. The product of claim 1 wherein the front compartment rail assembly and the rocker rail assembly each include a plurality of attachment areas;

wherein the attachment areas are at least 2 mm thick; and wherein the dash panel and the floor compartment rail assembly include a plurality of clearance holes constructed and arranged to accept a plurality of flow drill screws.

4. The product of claim 3 wherein the front compartment rail assembly is attached to the dash panel via a structural adhesive and a plurality of flow drill screws;

wherein the dash panel is attached to the floor compartment rail assembly via a structural adhesive and a plurality of flow drill screws; and wherein the floor compartment rail assembly is attached to the rocker rail assembly via a structural adhesive and a plurality of flow drill screws.

5. The product of claim 2 wherein the floor compartment rail assembly comprises a first component and a second component; wherein the first component is a beam structure and the second component is a bracket structure; and wherein the first component comprises a first grade of aluminum and the second component comprises a second grade of aluminum, and wherein the first grade of aluminum is different than the second grade of aluminum.

6. The product of claim 5 wherein the first floor compartment rail component and the second floor compartment rail component are attached together via spot welding.

7. The product of claim 1 wherein the floor compartment rail assembly splays outwardly as it extends from the dash panel to the rocker rail assembly.

8. The product of claim 7 wherein the floor compartment rail assembly is constructed and arranged outwardly to accommodate a flow drill screw gun.

9. The product of claim 1 wherein the longitudinal rail system is attached to a vehicle frame.

10. A method comprising:

constructing a mixed material longitudinal rail system comprising: attaching a steel dash panel and a steel floor compartment rail assembly to an aluminum front compartment rail assembly and an aluminum rocker rail assembly and wherein the steel dash panel and the steel floor compartment rail assembly are attached to the aluminum front compartment rail assembly and the aluminum rocker rail assembly via a structural adhesive and a plurality of flow drill screws.

11. The method of claim 10 wherein the floor compartment rail assembly is splayed outwardly from a vehicle.

12. The method of claim 10 wherein the floor compartment rail assembly comprises a first component and a second component.

13. The method of claim 12 wherein the first component comprises a first grade of aluminum and the second component comprises a second grade of aluminum.

14. The method of claim 12 wherein the first component and second component are attached via spot welding.

* * * * *